United States Patent Office 3,502,529
Patented Mar. 24, 1970

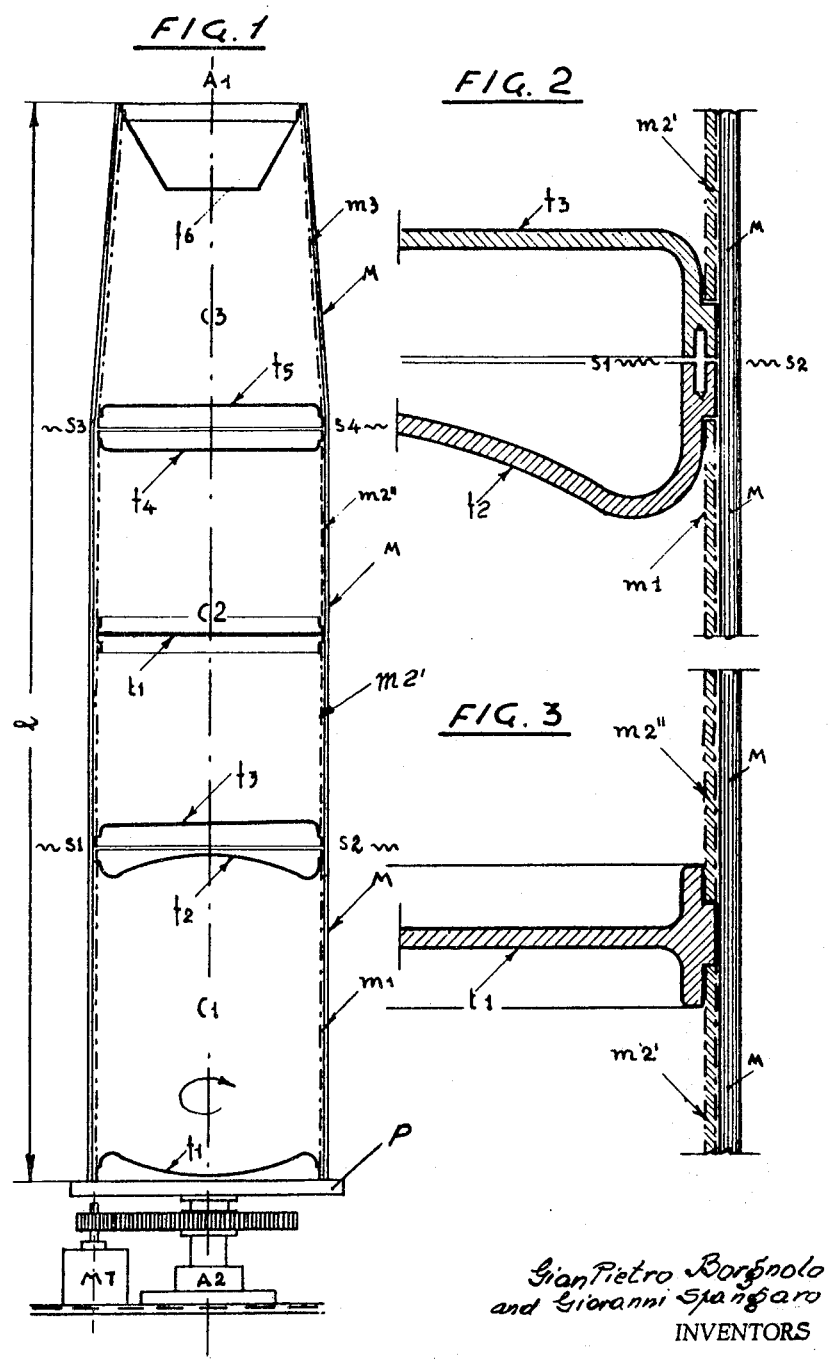

3,502,529
METHOD OF MAKING RESIN IMPREGNATED FILAMENTED WOUND STRUCTURES
Gian Pietro Borgnolo, Via Tarvisio 20, and Giovanni Spangaro, Via Codroi-po 112, both of Udine, Italy
Filed July 18, 1966, Ser. No. 566,094
Int. Cl. B65l 81/00
U.S. Cl. 156—172                    5 Claims

ABSTRACT OF THE DISCLOSURE

A plurality of transverse members are axially spaced along a longitudinal axis and sleeves are inserted between at least some of the members to thereby define a column. A filamentary, resin impregnated material is wound about the entire length of the column and after the resin is cured the column is cut transversely in the plane of at least some of the transverse members to thereby define a plurality of containers.

---

The present invention relates to plastic containers of polyester resins and the like, reinforced with glass fibers and the like. More particularly, it relates to a process for the semi-continuous manufacture of a plurality of containers of various types, from polyester resins and the like, reinforced with glass fibers.

It is known that, heretofore, the containers manufactured from glass fibers-reinforced polyester resins, have been made in accordance with systems which may be compared with artisan-like and craftsman-like methods. In fact, heretofore, it was necessary to effect separately the preparation of the mantles for each individual container by means of weaving machines, winding the glass filaments (duly impregnated with polyester resins) about the longitudinal axis of rotating molds. Since these molds must be removed after the winding operation is completed, they necessarily possess a somewhat conical shape, which shape is visible also on the mantle and, consequently, on the structure of the finished container itself.

Generally after the mantle is prepared, the bases (lower or upper) are applied thereto. These bases are produced in a separate operation, which requires an accurate manual work, by means of brushes, in order to effect a satisfactory joint and finishing of the separate elements.

It is clear, therefore, that with these aforementioned systems, it is practically impossible to standardize production and at the same time obtain constant quality and uniform costs in the product.

It is therefore, a main object of the present invention to provide for a process for manufacturing containers of polyester and the like resin reinforced with glass fibers or the like in a semi-continuous, uniform manner, regardless of the type of container produced.

These and other objects and advantages of the present invention will become apparent from the following description of the embodiments thereof and from the accompanying drawings in which:

FIG. 1 shows a rotating column with its rotational axis vertically positioned and suitable for the simultaneous preparation of three containers, $C_1$, $C_2$ and $C_3$;

FIG. 2 shows in cross-section a detail of the collar for the containers' bases; and FIG. 3 represents, also in cross-section, a preferred construction of said collar with bilateral flaps for the false mantles.

The process of the present invention is, briefly, characterized by the simultaneous fabrication, in a single and continuous operation, of the shell or mantle for a whole series or plurality of containers. This is carried out by winding (with a conventional winding machine) the glass fibers saturated with a suitable resin about a rotating column. The rotating column consists of the bases of the containers, which are suitably coupled with one another and separated one from the other by sleeves or false mantles. The column is, thus, forming the supporting element for the winding of the mantle, to which the bases (provided with suitable connecting collars) are intimately connected, without the need for additional operations.

In this way, it is possible to obtain a monolithic fabrication, through a single operation, of a whole plurality of containers, which subsequently may be readily subdivided by suitably cutting circularly the mantles at the predetermined heights.

The rotating column, which as aforementioned constitutes the supporting shank for the winding and weaving of the container's mantle, may be employed with its long axis in a vertical, horizontal or even inclined position. The axis proper may be virtual or real, in which latter case the result is a skewer-like assembly carrying on it the various bases of the containers. This variance might be conveniently useful only in certain specific and particular operations, in that the presence of a real axis in the rotating column signifies a central opening in the bases of the finished containers.

An essential feature in the process of the invention is the structural configuration of the perimetrical cylindrical collar of the bases of the containers. The collar is provided with unilateral or, if so desired, bilateral flaps for receiving and withholding the false mantle or mantles. This collar, basically, constitutes, as explained herebelow, the binding and connecting band whereat the base of the container joins the mantle.

The bases of the containers, which may be produced separately by means of conventional hot-pressing operations, may have any desired shape, such as flat, crowned trunco-conical, hopper-like, etc. The bases, suitably inserted in the rotating column, may also form the separating baffles within the container, in which case, the perimetrical collar of the baffle should be provided with bilateral flaps (rather than a single flap) for the false mantles.

Depending on the structural configuration of the bases and of the false mantles, the process of the present invention will, consequently, permit the fabrictaion of containers of any desired shape and size, such as, for example, circular, oval, polygonal, square, rectangular, etc., with mantles perfectly cylindrical conical, trunco-conical or of intermediate and mixed shape.

It is clear, therefore, that the present process provides for the semi-continuous manufacture of containers, even different from one another, in a single operation. The actual manual work is, thusly, reduced to a minimum and is restricted to the addition of accessories, such as, for example, port holes and the like, attachments for valves, supports and similar footings, etc.

It should, furthermore, be pointed out that the false mantles, which separate the bases from one another and constitute the supporting column for the winding of the impregnated glass fibers, may be made of discardable and, consequently, cheap material. For particular and specific purposes, however, the false mantle may be made of more valuable, special materials, which, when left in the finished product, constitute the inner finished surface of the container.

Referring now to FIG. 1 of the drawings, the platform P is caused to be rotated about the vertical axis $A_1$–$A_2$ by means of a suitable motor MT. On platform P is located, coaxially thereto, the base $f_1$ of the first container $C_1$, held in place by control pins (not shown). On base $f_1$ is located the false mantle M1 (shown in broken lines) for the same first container C1. Upon C1 is positioned the second base f2. In juxtaposition with the collar of the base f2 is positioned base f3 of the container C2, held in position by cotntrol pins (not shown) applied correspondingly to the contact surfaces of the two bases. On base f3 is, then, mounted the false mantle M2 and, above thereto, the base f4.

The assembly is then repeated with respect to base f5, false mantle M3, base f6 of container C3 and to the eventual upper elements, should the column be formed of a greater number of containers.

It can also be seen from FIG. 1 that in container C2 there is inserted a partition t1, for subdividing in two parts the container C2. For illustration purposes, the upper container C3 is shown of trunco-conical shape with the upper base f6 shaped as a hopper.

After preparing the column, the length of which may vary depending on the length of the various containers and on the plant facilities available, the mantle M is wound thereon with glass fibers impregnated with polyester resins or the like. Conventional methods may be used for curing the resin such as by heating as disclosed in U.S. Patent 3,378,426. Self-curing resins may also be used so that the curing step involves exposing the resin impregnated filaments to air. The winding is effected in a single operation and continuously by means of suitable and conventional winding machines. The winding is effected along the entire length l of the column. In this manner, the bases f1-f6 of the three containers and the divider t1 of the container C2 remain perfectly connected by means of their perimetrical collar to the mantle, without need of additional operation.

Reference characters m2' and m2" designate typical sections of an inner sleeve positioned, respectively, below and above the base f1.

The separation of the three containers, shown in the drawings, is effected by circularly cutting the column in correspondence to the sections S1–S2 and, respectively, S3–S4.

The process, as hereabove described, provides, therefore, for a rotating column of novel characteristics, vertically mounted and rotating about its vertical axis. This arrangement is, obviously, the most convenient because of ease of mounting of the various elements of the column. It is, however, well within the scope of the invention, to position the column with its axis of rotation in a horizontal or even inclined position. The axis may be, if so desired, a real one, such as a shaft, as hereinbefore described.

The process of the invention offers numerous advantages, such as, for example, a reduction in production costs, a control in the uniformity of the product, a higher quality and superior appearance of the product, a better finishing, a reduction in shut-downs, a requirement for lower inventories, etc.

What is claimed is:

1. A method for producing resin impregnated, filament wound structures comprising the steps of:
   (a) positioning a plurality of base members transversely with respect to a longitudinal axis;
   (b) inserting an axially elongated sleeve between at least some of the base members to thereby define a column;
   (c) winding a filamentary material about the entire length of the column;
   (d) impregnating the filamentary material with resin;
   (e) curing the resin; and,
   (f) dividing the wound column into a plurality of containers each of which includes at least one of the base members.

2. The method in accordance with claim 1 wherein said winding step comprises rotating the column about the longitudinal axis thereof.

3. The method in accordance with claim 1 wherein said dividing step comprises cutting the wound column transversely to the longitudinal axis thereof.

4. The method in accordance with claim 1 wherein said dividing step comprises cutting the wound column transversely to the longitudinal axis thereof in the plane of at least some of the base members.

5. The method in accordance with claim 1 further including the step of removing the sleeves after the resin is cured.

References Cited
UNITED STATES PATENTS 3,341,387 9/1967 Boggs _____ 156—175
3,251,500 5/1966 Archbold _____ 156—172 XR PHILIP DIER, Primary Examiner U.S. Cl. X.R.

156—173, 175, 269, 433; 220—383; 242—2